Dec. 30, 1958 J. A. LANDIS 2,866,202
EYE SHIELD
Filed April 7, 1955
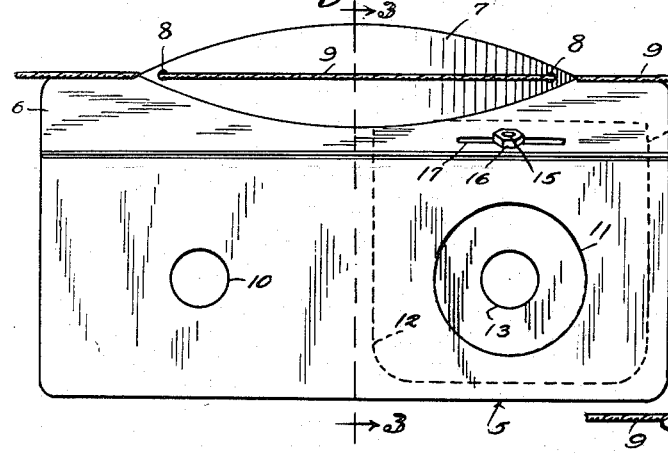
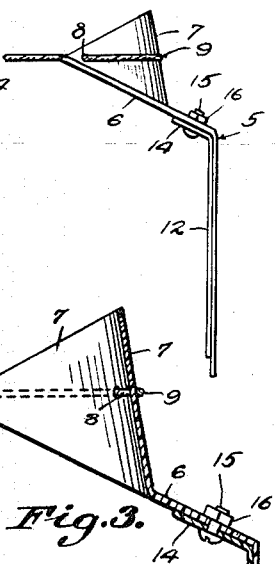
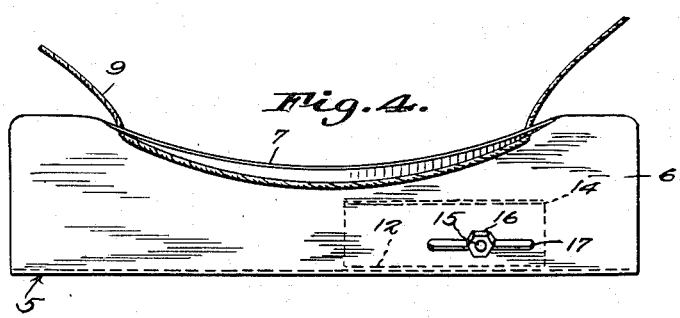
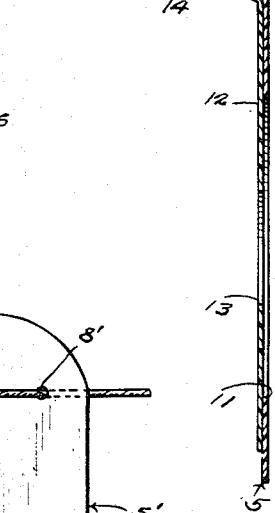
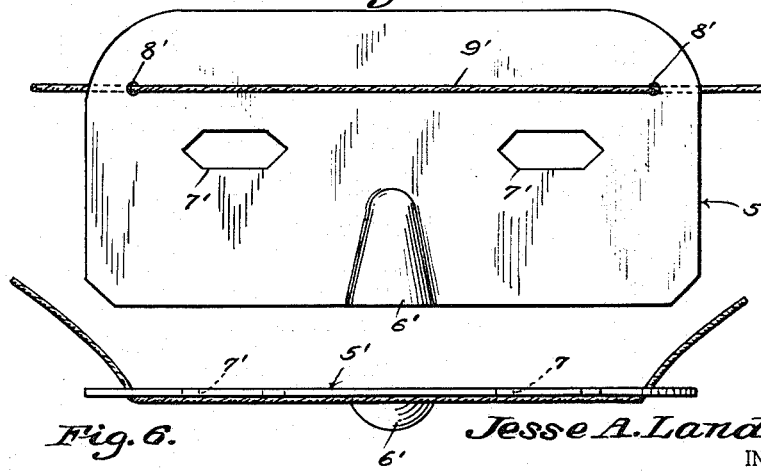
Jesse A. Landis
INVENTOR
BY
ATTORNEYS.

United States Patent Office 2,866,202
Patented Dec. 30, 1958

2,866,202

EYE SHIELD

Jesse A. Landis, Eaton, Ohio

Application April 7, 1955, Serial No. 499,936

1 Claim. (Cl. 2—12)

This invention relates to eye shields especially designed for use in viewing television programs, the primary object of the invention being to provide an eye shield which will shade the eyes of the wearer from the area other than the area adjacent to the picture, or the area desired to remain unshaded resulting in a clearer picture and improving substantially the quality of the picture.

An important object of the invention is to provide an eye shield including a viewing area with adjustable means for regulating and reducing the size of the viewing opening of the shield, thereby increasing the contrast of light between the unshielded area of the shield and consequently reducing the eye strain, due to the fact that the light viewed from both areas tends to brighten the unshaded area and increase vision ability.

A still further object of the invention is to provide a shield of this character which will closely fit the head of the user and may be fitted over the eyes of the person using the shield regardless of whether the person is wearing conventional eyeglasses, and in which the spacing between the eye openings may be readily adjusted in accordance with the distance between the eyes of the user for maximum individual comfort.

Other and further objects and advantages of the invention will be hereinafter described and the novel features thereof defined in the appended claim.

Referring to the drawings:

Fig. 1 is a front elevational view of an eye shield, constructed in accordance with the invention.

Fig. 2 is an edge elevational view thereof.

Fig. 3 is an enlarged sectional view taken on the line 3—3 of Fig. 1.

Fig. 4 is a plan view of the shield.

Fig. 5 is a front elevational view of a modified form of the invention.

Fig. 6 is a plan view thereof.

Referring to the drawing in detail the shield comprises a flat sheet of translucent semi-rigid material 5 which constitutes the body portion of the shield, which is of a length and width to extend across the forehead of the wearer of the shield and extends downwardly to a point directly over the nose of the wearer.

One longitudinal edge of the body portion is inclined rearwardly at 6 providing a flange along the entire length of the shield, a portion of the flange being curved upwardly and transversely providing a headpiece 7 adapted to fit over the forehead of the person using the shield. The headpiece 7 is formed with openings 8 at its ends, which openings accommodate the string 9 by means of which the device may be readily tied on the head of the wearer.

The translucent body 5 of the shield is provided with circular viewing openings 10 and 11, the opening 11 being substantially large as compared with the opening 10 to provide a larger sight opening, if desired.

The reference character 12 indicates a flat shield plate constructed of translucent material. This shield plate is rectangular in formation and fits against the rear surface of the translucent body portion 5. This shield plate 12 is provided with a smaller circular sight opening 13, substantially equal in diameter to the opening 10, that falls within the sight opening 11 to reduce the diameter of the sight opening 11 and consequently reduce the viewing area through the shield and increasing the shaded area adjacent to the opening.

This shield plate is formed with an inclined flange 14 inclined rearwardly, the inclined flange 14 being fitted against the inclined flange 6 with its front surface contacting the rear surface of the translucent body 5, as better shown by Fig. 3 of the drawing.

Said flange 14 is provided with an aperture through which a bolt 15 extends, the bolt 15 also extending into an elongated slot 17, formed in the inwardly inclined flange 6 to the end that the shield plate 12 may be adjusted laterally, to vary the distance between the sight openings of the shield to accommodate the device to individual users having different spacing between the eyes. A nut 16 is secured on the bolt 15 and affords means for tightening the shield plate in its position of lateral adjustment.

In the form of the invention as shown by Fig. 5 in the drawing, the reference character 5' indicates the body portion of the shield which is constructed of translucent material of a yieldable character, the body portion 5' having its lower edge formed with a depression 6' of a shape to fit over the nose of the wearer of the shield.

Elongated openings 7' are formed in the shield and constitute the viewing openings of the shield through which the person using the shield may view the television with the eyes concentrated on the picture, and the translucent body shading the eyes against excessive light around the viewing openings of the shield.

In this form of the invention the body portion is formed with openings 8' through which the cord 9' is extended and held, the cord 9' affording means whereby the device may be tied over the forehead of the wearer with the sight openings 7' directly in front of the eyes of the wearer.

From the foregoing it will be seen that due to the construction shown and described, I have provided a shield especially designed for viewing television programs, the shield having sight or viewing openings through which the television program may be viewed, with the translucent portion of the eye shield cutting out excessive light adjacent to the sight or viewing openings of the shield with the result that eye strain, due to the viewing of the television, is reduced to a minimum.

It will further be seen that because of the adjustable feature of the shield plate, the viewing openings may be adjusted so that the shield may be used by persons with eyes spaced various distances apart, by merely adjusting the shield plate.

While the specific details of one embodiment of this invention have been herein shown and described, the invention is not confined thereto as changes and alterations may be made without departing from the spirit and scope thereof as defined in the appended claim.

What is claimed is:

In an eye shield, a body comprising a flat sheet of translucent material, one longitudinal edge of said body being extended rearwardly and upwardly inclined providing a flange along one edge of said body, said body having sight openings formed therein, one of said sight openings being substantially larger in diameter than the other sight opening, said flange having a slot elongated longitudinally of said flange, a shield plate mounted for transverse sliding movement on the rear surface of said body, a rearwardly extended flange formed along one edge of said shield plate fitted against said flange of said body, said shield plate having a sight opening equal in diameter to the small sight opening of said body adapted to lie within the confines of said large sight opening for visibility therethrough, the flange of said shield plate having an opening registering with said slot in said flange of said body, and a bolt extending through said registering slot and opening of said shield plate flange for securing said shield plate in its positions of transverse adjustment.

References Cited in the file of this patent

UNITED STATES PATENTS

| | | |
|---|---|---|
| 742,081 | Stierle | Oct. 20, 1903 |
| 1,637,406 | Brumer | Aug. 2, 1927 |
| 2,419,917 | Robeson | Apr. 29, 1947 |
| 2,663,021 | Douglas | Dec. 22, 1953 |

FOREIGN PATENTS

| | | |
|---|---|---|
| 340,422 | France | May 11, 1904 |
| 618,268 | France | Dec. 10, 1926 |
| 471,863 | Great Britain | Sept. 10, 1937 |
| 866,887 | France | June 16, 1941 |